United States Patent
Cho et al.

(10) Patent No.: US 8,204,020 B2
(45) Date of Patent: Jun. 19, 2012

(54) METHOD AND APPARATUS FOR MAPPING RESOURCE UNIT IN WIRELESS COMMUNICATION SYSTEM

(75) Inventors: Han Gyu Cho, Anyang-si (KR); Jinsoo Choi, Anyang-si (KR); Jin Sam Kwak, Anyang-si (KR); Seung Hyun Kang, Anyang-si (KR); Sung Ho Moon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 309 days.

(21) Appl. No.: 12/603,205

(22) Filed: Oct. 21, 2009

(65) Prior Publication Data
US 2010/0103894 A1     Apr. 29, 2010

Related U.S. Application Data

(60) Provisional application No. 61/107,349, filed on Oct. 22, 2008, provisional application No. 61/120,066, filed on Dec. 5, 2008, provisional application No. 61/120,490, filed on Dec. 8, 2008, provisional application No. 61/121,557, filed on Dec. 11, 2008.

(30) Foreign Application Priority Data

Sep. 9, 2009     (KR) .................. 10-2009-0084711

(51) Int. Cl.
 *H04W 4/00* (2009.01)
(52) U.S. Cl. ........................ 370/330; 375/260
(58) Field of Classification Search .......... 370/208–210, 370/330, 436; 375/260
See application file for complete search history.

(56) References Cited

U.S. PATENT DOCUMENTS

| | | | |
|---|---|---|---|
| 2006/0018279 A1 | 1/2006 | Agrawal et al. | |
| 2007/0201398 A1 | 8/2007 | Yang et al. | |
| 2007/0206559 A1 | 9/2007 | Cho et al. | |
| 2007/0217362 A1 | 9/2007 | Kashima et al. | |
| 2007/0298809 A1 | 12/2007 | So | |
| 2008/0013599 A1* | 1/2008 | Malladi | 375/132 |
| 2008/0034107 A1 | 2/2008 | Lee et al. | |
| 2008/0225788 A1 | 9/2008 | Inoue et al. | |
| 2008/0227481 A1 | 9/2008 | Naguib et al. | |
| 2009/0262699 A1* | 10/2009 | Wengerter et al. | 370/330 |
| 2010/0061345 A1* | 3/2010 | Wengerter et al. | 370/335 |
| 2010/0068006 A1* | 3/2010 | Littlewood et al. | 414/22.61 |
| 2010/0103894 A1 | 4/2010 | Cho et al. | |
| 2010/0103896 A1* | 4/2010 | Cho et al. | 370/329 |

(Continued)

FOREIGN PATENT DOCUMENTS
KR  10-2007-0049091 A    5/2007

(Continued)

*Primary Examiner* — Phuc Tran
(74) *Attorney, Agent, or Firm* — Birch Stewart Kolasch & Birch, LLP

(57) ABSTRACT

A method and apparatus for mapping a resource unit in a wireless communication system is provided. The method includes obtaining a frequency partition (FP) count (FPCT), an size of FPi (FPS) for i>0, and subband (SB) count of FPi (FPSC) for i>0 (where FPi is an $i^{th}$ FP), obtaining a value $K_{SB,FPi}$ indicating an SB count for FPi and a value $K_{MB,FPi}$ indicating a miniband (MB) count for FPi on the basis of the FPCT, the FPS, and the FPSC, and mapping an SB PRU including a plurality of contiguous physical resource units (PRUs) and an MB PRU including a plurality of contiguous PRUs to each FP in a granularity of a PRU set on the basis of the values $K_{SB,FPi}$ and $K_{MB,FPi}$. Each FP can obtain a frequency selective scheduling gain based on the SB and a frequency diversity gain based on the MB.

8 Claims, 10 Drawing Sheets

U.S. PATENT DOCUMENTS

2010/0165935 A1* 7/2010 Cho et al. .................. 370/329
2010/0255851 A1 10/2010 Kwak et al.

FOREIGN PATENT DOCUMENTS

| | | |
|---|---|---|
| KR | 10-2008-0038967 A | 5/2008 |
| KR | 10-2008-0056616 A | 6/2008 |
| KR | 10-2008-0081537 A | 9/2008 |
| KR | 10-2008-0082943 A | 9/2008 |
| WO | WO 2007/094628 A1 | 8/2007 |
| WO | WO 2007/099839 A1 | 9/2007 |

* cited by examiner

METHOD AND APPARATUS FOR MAPPING RESOURCE UNIT IN WIRELESS COMMUNICATION SYSTEM

CROSS-REFERENCE TO RELATED APPLICATIONS

This application claims the benefit of priority of U.S. Provisional application No. 61/107,349 filed on Oct. 22, 2008, U.S. Provisional application No. 61/120,066 filed on Dec. 5, 2008, U.S. Provisional application No. 61/120,490 filed on Dec. 8, 2008, U.S. Provisional application No. 61/121,557 filed on Dec. 11, 2008, and Korean Patent Application No. 10-2009-0084711 filed on Sep. 9, 2009, all of which are incorporated by reference in their entirety herein.

BACKGROUND OF THE INVENTION

1. Field of the Invention

The present invention relates to wireless communications, and more particularly, to a method and apparatus for mapping a resource unit in a wireless communication system.

2. Related Art

The institute of electrical and electronics engineers (IEEE) 802.16e standard was adopted in 2007 as a sixth standard for international mobile telecommunication (IMT)-2000 in the name of 'WMAN-OFDMA TDD' by the ITU-radio communication sector (ITU-R) which is one of sectors of the international telecommunication union (ITU). An IMT-advanced system has been prepared by the ITU-R as a next generation (i.e., 4th generation) mobile communication standard following the IMT-2000. It was determined by the IEEE 802.16 working group (WG) to conduct the 802.16m project for the purpose of creating an amendment standard of the existing IEEE 802.16e as a standard for the IMT-advanced system. As can be seen in the purpose above, the 802.16m standard has two aspects, that is, continuity from the past (i.e., the amendment of the existing 802.16e standard) and continuity to the future (i.e., the standard for the next generation IMT-advanced system). Therefore, the 802.16m standard needs to satisfy all requirements for the IMT-advanced system while maintaining compatibility with a mobile WiMAX system conforming to the 802.16e standard.

An orthogonal frequency division multiplexing (OFDM) system capable of reducing inter-symbol interference (ISI) with a low complexity is taken into consideration as one of next generation wireless communication systems. In the OFDM, a serially input data symbol is converted into N parallel data symbols, and is then transmitted by being carried on each of separated N subcarriers. The subcarriers maintain orthogonality in a frequency dimension. Each orthogonal channel experiences mutually independent frequency selective fading, and an interval of a transmitted symbol is increased, thereby minimizing inter-symbol interference. In a system using the OFDM as a modulation scheme, orthogonal frequency division multiple access (OFDMA) is a multiple access scheme in which multiple access is achieved by independently providing some of available subcarriers to a plurality of users. In the OFDMA, frequency resources (i.e., subcarriers) are provided to the respective users, and the respective frequency resources do not overlap with one another in general since they are independently provided to the plurality of users. Consequently, the frequency resources are allocated to the respective users in a mutually exclusive manner.

In an OFDMA system, frequency diversity for multiple users can be obtained by using frequency selective scheduling, and subcarriers can be allocated variously according to a permutation rule for the subcarriers. In addition, a spatial multiplexing scheme using multiple antennas can be used to increase efficiency of a spatial domain.

Meanwhile, radio resources can be divided into a plurality of frequency partitions (FPs) when providing a service such as a multicast and broadcast service (MBS). This is referred to as fractional frequency reuse (FFR). Each FP can be used for other usages. In each FP, a distributed subchannel and a localized subchannel can coexist in a frequency division multiplexing (FDM) manner. Further, each FP can allocate a subchannel in a granularity of resources having difference sizes. Therefore, subchannel allocation has to be achieved by considering not only various factors but also trade-off caused by these factors.

Accordingly, there is a need for a method of effectively mapping a resource unit in subchannel allocation.

SUMMARY OF THE INVENTION

The present invention provides a method and apparatus for mapping a resource unit in a wireless communication system.

According to one aspect of the present invention, a method of mapping a resource unit in a wireless communication system is provided. The method includes: obtaining a frequency partition (FP) count (FPCT), an FPi size (FPS) for i>0, and an FPi subband (SB) count (FPSC) for i>0 (where FPi is an $i^{th}$ FP); obtaining a value $K_{SB,FPi}$ indicating an SB count for each FP and a value $K_{MB,FPi}$ indicating a miniband (MB) count for each FP on the basis of the FPCT, the FPS, and the FPSC; and mapping an SB PRU (i.e., $PRU_{SB}$) including a plurality of contiguous physical resource units (PRUs) and an MB PRU (i.e., $PRU_{MB}$) including a plurality of contiguous PRUs to each FP in a granularity of a PRU set on the basis of the values $K_{SB,FPi}$ and $K_{MB,FPi}$, wherein the PRU set includes PRUs whose number is equal to the number of the plurality of contiguous PRUs included in one SB. In addition, the mapping of the $PRU_{MB}$ to each FP in a granularity of the PRU set may include: mapping the $PRU_{MB}$ to a permutated $PRU_{MB}$ ($PPRU_{MB}$) by performing permutation in a PRU granularity; and mapping the $PPRU_{MB}$ to each FP in a granularity of the PRU set. In addition, the FPCT, the FPS, and the FPSC may be broadcast and may vary depending on a bandwidth.

According to another aspect of the present invention, a method of transmitting data in a wireless communication system is provided. The method includes: mapping a part of a part of a $PRU_{FPi}$, which is a logical resource included in an $i^{th}$ FP (i.e., FPi), to a $PRU_{SB}$; mapping the remaining parts of the $PRU_{FPi}$ to a $PRU_{MB}$ after mapping to the $PRU_{SB}$; mapping the $PRU_{SB}$ or the $PRU_{MB}$ in a granularity of a PRU set to a PRU which is a physical radio resource; and transmitting data by using the PRU, wherein the $PRU_{SB}$ is allocated with at least one SB including a plurality of contiguous PRUs, the $PRU_{MB}$ is allocated with at least one MB including a plurality of contiguous PRUs, and the PRU set includes PRUs whose number is equal to the number of the plurality of contiguous PRUs included in one SB. In addition, the mapping of the remaining parts of the $PRU_{FPi}$ to the $PRU_{MB}$ may include: mapping the remaining parts of the $PRU_{FPi}$ to a $PPRU_{MB}$; and mapping the $PPRU_{MB}$ to the $PRU_{MB}$ by performing permutation.

According to another aspect of the present invention, a user equipment in a wireless communication system is provided. The user equipment includes: a processor; and a radio frequency (RF) unit coupled to the processor, wherein the processor obtains a frequency partition (FP) count (FPCT), an FPi size (FPS) for i>0, and an FPi subband (SB) count (FPSC)

for i>0 (where FPi is an $i^{th}$ FP), obtains a value $K_{SB,FPi}$ indicating an SB count for each FP and a value $K_{MB,FPi}$ indicating a miniband (MB) count for each FP on the basis of the FPCT, the FPS, and the FPSC, and maps an SB PRU (i.e., $PRU_{SB}$) including a plurality of contiguous physical resource units (PRUs) and an MB PRU (i.e., $PRU_{MB}$) including a plurality of contiguous PRUs to each FP in a granularity of a PRU set on the basis of the values $K_{SB,FPi}$ and $K_{MB,FPi}$, wherein the PRU set includes PRUs whose number is equal to the number of the plurality of contiguous PRUs included in one SB.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the IEEE 802.16m. However, technical features of the present invention are not limited thereto.

Figure 1:
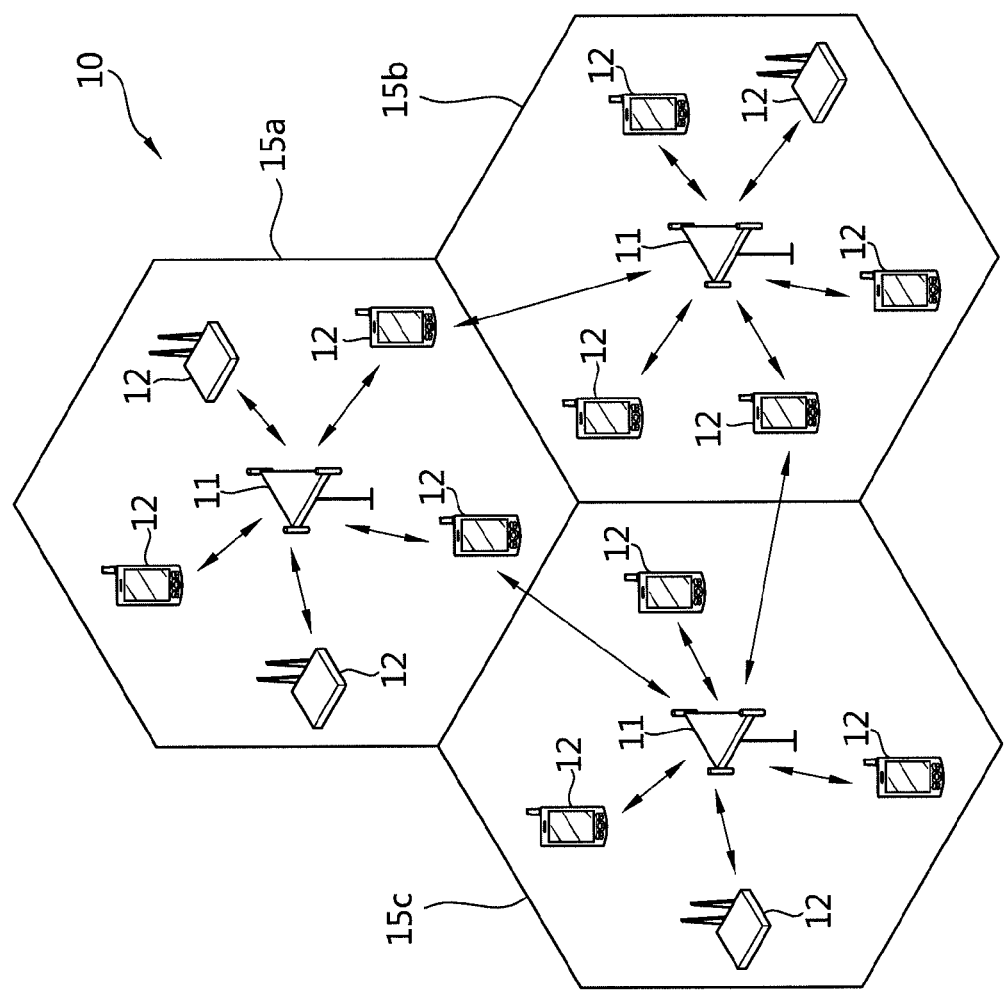
FIG. 1 shows a wireless communication system.

FIG. 1 shows a wireless communication system. Referring to FIG. 1, a wireless communication system 10 includes at least one base station (BS) 11. Respective BSs 11 provide communication services to specific geographical regions (generally referred to as cells) 15a, 15b, and 15c. The cell can be divided into a plurality of regions (referred to as sectors).

A user equipment (UE) 12 may be fixed or mobile, and may be referred to as another terminology, such as a mobile station (MS), a user terminal (UT), a subscriber station (SS), a wireless device, a personal digital assistant (PDA), a wireless modem, a handheld device, etc. The BS 11 is generally a fixed station that communicates with the UE 12 and may be referred to as another terminology, such as an evolved node-B (eNB), a base transceiver system (BTS), an access point, etc.

A UE belongs to one cell. A cell to which the UE belongs is referred to as a serving cell. A BS providing a communication service to the serving cell is referred to as a serving BS. Since a wireless communication system is a cellular system, there is another cell adjacent to the serving cell. The cell adjacent to the serving cell is referred to as a neighbor cell. A BS providing a communication service to the neighbor cell is referred to as a neighbor BS. The serving cell and the neighbor cell are determined relatively with respect to the UE.

This technique can be used for downlink or uplink. In general, the downlink represents communication from the BS 11 to the UE 12, and the uplink represents communication from the UE 12 to the BS 11. In the downlink, a transmitter is a part of the BS 11, and a receiver is a part of the UE 12. In the uplink, the transmitter is a part of the UE 12, and the receiver is a part of the BS 11.

Figure 2:
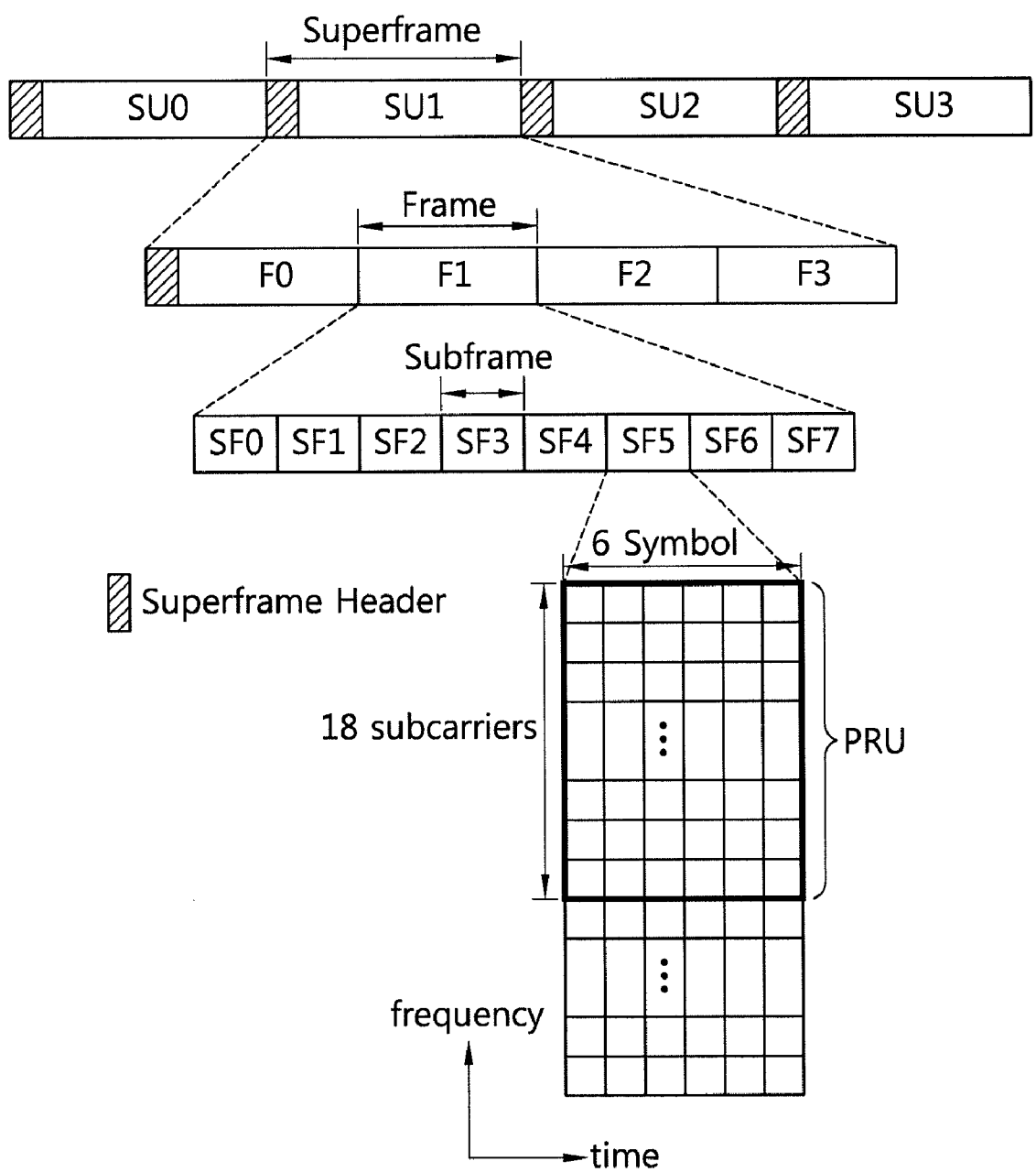
FIG. 2 shows an example of a frame structure.

FIG. 2 shows an example of a frame structure.

Referring to FIG. 2, a superframe (SF) includes a superframe header (SFH) and four frames F0, F1, F2, and F3. Each frame may have the same length in the SF. Although it is shown that each SF has a size of 20 milliseconds (ms) and each frame has a size of 5 ms, the present invention is not limited thereto. A length of the SF, the number of frames included in the SF, the number of SFs included in the frame, or the like can change variously. The number of SFs included in the frame may change variously according to a channel bandwidth and a cyclic prefix (CP) length.

The SFH can carry an essential system parameter and system configuration information. The SFH may be located in a first subframe of the SF. The SFH can be classified into a primary-SFH (P-SFH) and a secondary-SFH (S-SFH). The P-SFH and the S-SFH may be transmitted in every superframe.

One frame includes 8 subframes SF0, SF1, SF2, SF3, SF4, SF5, SF6, and SF7. Each subframe can be used for uplink or downlink transmission. One subframe includes a plurality of orthogonal frequency division multiplexing (OFDM) symbols in a time domain, and includes a plurality of subcarriers in a frequency domain. An OFDM symbol is for representing one symbol period, and can be referred to as other terminologies such as an OFDM symbol, an SC-FDMA symbol, etc., according to a multiple access scheme. The subframe can consist of 5, 6, 7, or 9 OFDM symbols. However, this is for exemplary purposes only, and thus the number of OFDM symbols included in the subframe is not limited thereto. The number of OFDM symbols included in the subframe may change variously according to a channel bandwidth and a CP length. A subframe type may be defined according to the number of OFDM symbols included in the subframe. For example, it can be defined such that a type-1 subframe includes 6 OFDM symbols, a type-2 subframe includes 7 OFDM symbols, a type-3 subframe includes 5 OFDM symbols, and a type-4 subframe includes 9 OFDM symbols. One frame may include subframes each having the same type. Alternatively, one frame may include subframes each having a different type. That is, the number of OFDM symbols included in each subframe may be identical or different in one frame. Alternatively, the number of OFDM symbols included in at least one subframe of one frame may be different from the number of OFDM symbols of the remaining subframes of the frame.

Time division duplexing (TDD) or frequency division duplexing (FDD) may be applied to the frame. In the TDD, each subframe is used in uplink or downlink transmission at the same frequency and at a different time. That is, subframes included in a TDD frame are divided into an uplink subframe and a downlink subframe in the time domain. In the FDD, each subframe is used in uplink or downlink transmission at the same time and at a different frequency. That is, subframes included in an FDD frame are divided into an uplink subframe and a downlink subframe in the frequency domain. Uplink transmission and downlink transmission occupy different frequency bands and can be simultaneously performed.

A subframe includes a plurality of physical resource units (PRUs) in the frequency domain. The PRU is a basic physical unit for resource allocation, and consists of a plurality of consecutive OFDM symbols in the time domain and a plurality of consecutive subcarriers in the frequency domain. The number of OFDM symbols included in the PRU may be equal to the number of OFDM symbols included in one subframe. Therefore, the number of OFDM symbols in the PRU can be determined according to a subframe type. For example, when one subframe consists of 6 OFDM symbols, the PRU may be defined with 18 subcarriers and 6 OFDM symbols.

A logical resource unit (LRU) is a basic logical unit for distributed resource allocation and contiguous resource allocation. The LRU is defined with a plurality of OFDM symbols and a plurality of subcarriers, and includes pilots used in the PRU. Therefore, a desired number of subcarriers for one LRU depends on the number of allocated pilots.

A distributed resource unit (DRU) may be used to obtain a frequency diversity gain. The DRU includes a distributed subcarrier group in one frequency partition. The DRU has the same size as the PRU. One subcarrier is a basic unit of constituting the DRU. A distributed logical resource unit (DLRU) can be obtained by performing subcarrier permutation on the DRU.

A contiguous resource unit (CRU) may be used to obtain a frequency selective scheduling gain. The CRU includes a localized subcarrier group. The CRU has the same size as the PRU. A contiguous logical resource unit (CLRU) can be obtained by directly mapping the CRU.

Meanwhile, a fractional frequency reuse (FFR) scheme can be used in a cellular system having multiple cells. The FFR scheme splits a full frequency band into a plurality of frequency partitions (FPs), and allocates a part of the FP to each cell. According to the FFR scheme, different FPs can be allocated between neighbor cells, and the same FP can be allocated between cells separated far from one another. Therefore, inter-cell interference (ICI) can be reduced, and performance of a UE located in a cell edge can be increased.

Figure 3:
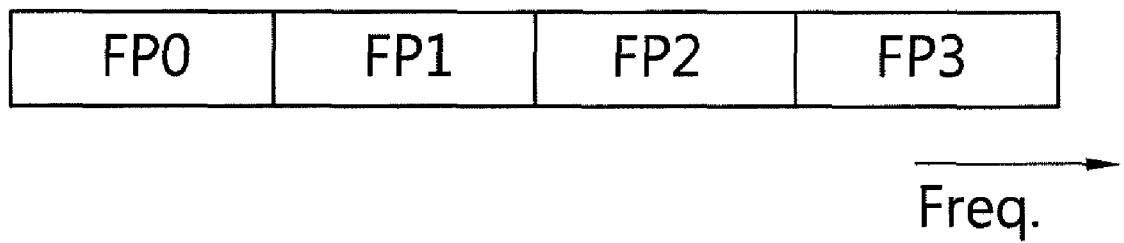
FIG. 3 shows an example of a method of splitting a full frequency band into a plurality of frequency partitions.

FIG. 3 shows an example of a method of splitting a full frequency band into a plurality of FPs.

Referring to FIG. 3, the full frequency band is split into first to fourth FPs (i.e., FP0, FP1, FP2, and FP3). Each FP can be physically or logically split from the full frequency band.

Figure 4:
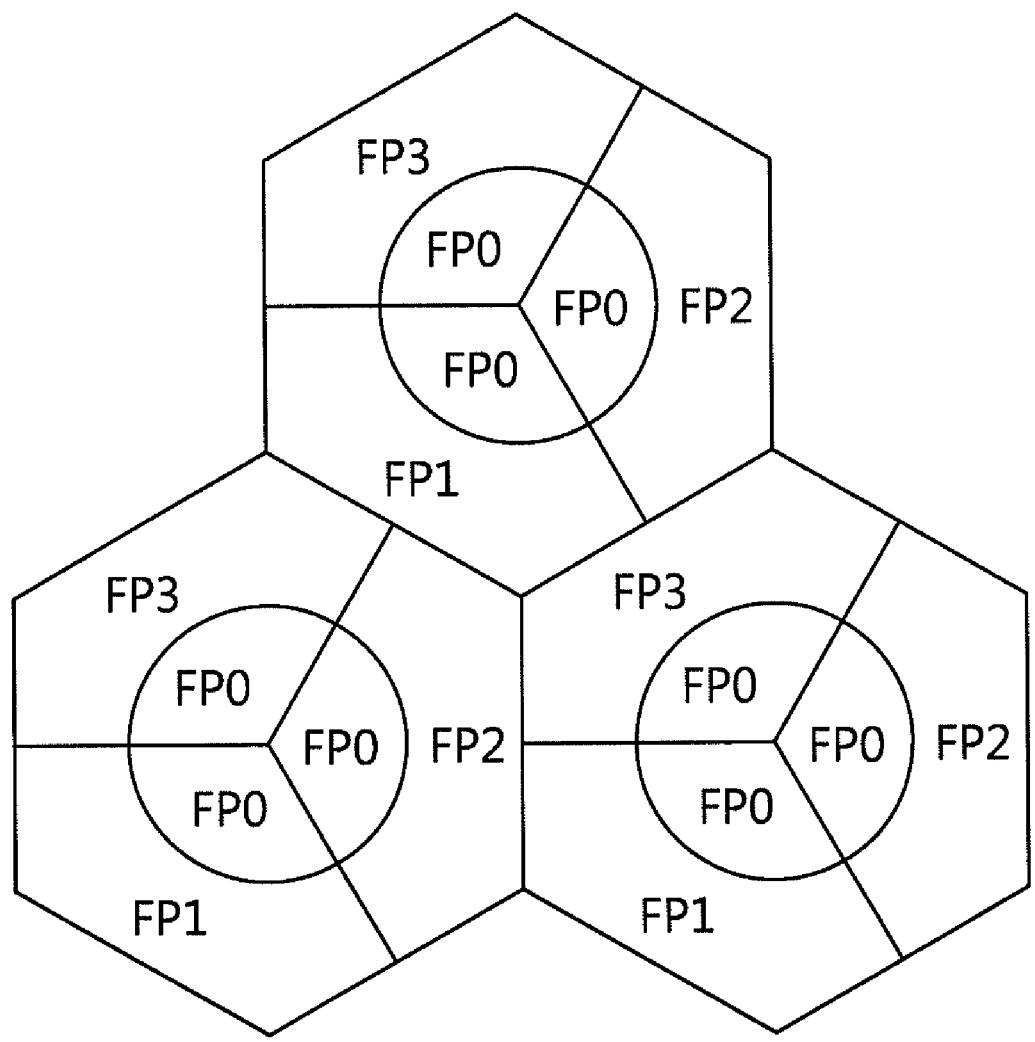
FIG. 4 shows an example of a cellular system using a fractional frequency reuse (FFR) scheme.

FIG. 4 shows an example of a cellular system using an FFR scheme.

Referring to FIG. 4, each cell is divided into an inner cell and a cell edge. Further, each cell is divided into three sectors. It is assumed that a full frequency band is split into three FPs (i.e., FP1, FP2, and FP3), and a first FP (i.e., FP0) includes second and third FPs (i.e., FP1 and FP2), and a fourth FP (i.e., FP3). That is, the first FP (i.e., FP0) is identical to the full frequency band.

The first FP (i.e., FP0) is allocated in an inner cell. Any one of the second to fourth FPs (i.e., FP1 to FP3) is allocated in each sector of a cell edge. In this case, different FPs are allocated between neighbor cells. Hereinafter, an allocated FP is referred to as an active FP, and an unallocated FP is referred to as an inactive FP. For example, when the second FP (i.e., FP1) is allocated, the second FP is an active FP, and the third to fourth FPs (i.e., FP2 and FP3) are inactive FPs.

A frequency reuse factor (FRF) can be defined according to the number of cells (or sectors) into which the full frequency band can be split. In this case, the FRF may be 1 in an inner cell, and may be 3 in each sector of a cell edge.

Figure 5:
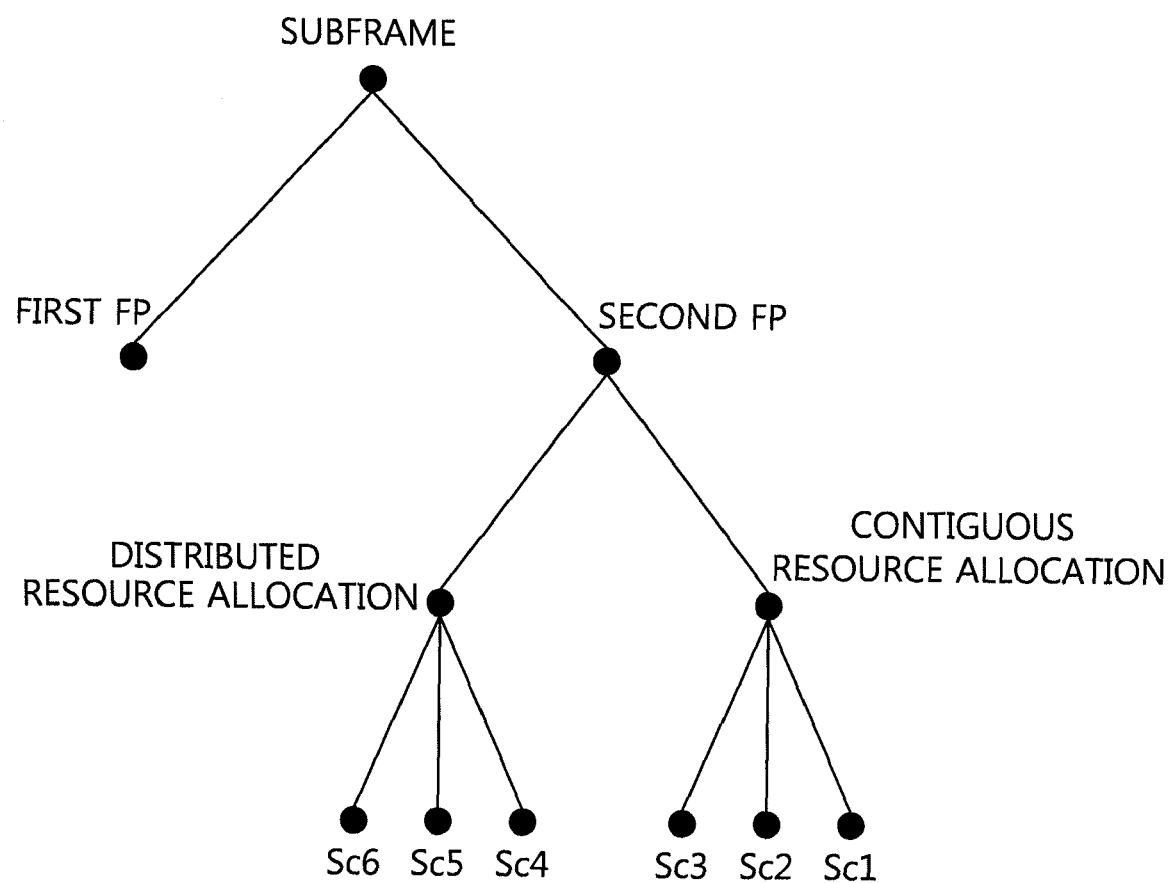
FIG. 5 shows an example of a downlink resource structure.

FIG. 5 shows an example of a downlink resource structure.

Referring to FIG. 5, a downlink subframe can be divided into at least one FP. Herein, the subframe is divided into two FPs (i.e., FP1 and FP2) for example. However, the number of FPs in the subframe is not limited thereto. Each FP can be used for other purposes such as FFR.

Each FP consists of at least one PRU. Each FP may include distributed resource allocation and/or contiguous resource allocation. Herein, the second FP (i.e., FP2) includes the distributed resource allocation and the contiguous resource allocation. 'Sc' denotes a subcarrier.

Meanwhile, a radio resource may be optionally split into several subchannels by performing subchannelization. The subchannel may include a distributed subchannel and a contiguous subchannel. The distributed subchannel may be a DLRU, and the contiguous subchannel may be a CLRU. The subchannelization may allow a subcarrier of a URL to be spread over the full bandwidth.

The subchannelization is applied by considering the following aspects.

Figure 6:
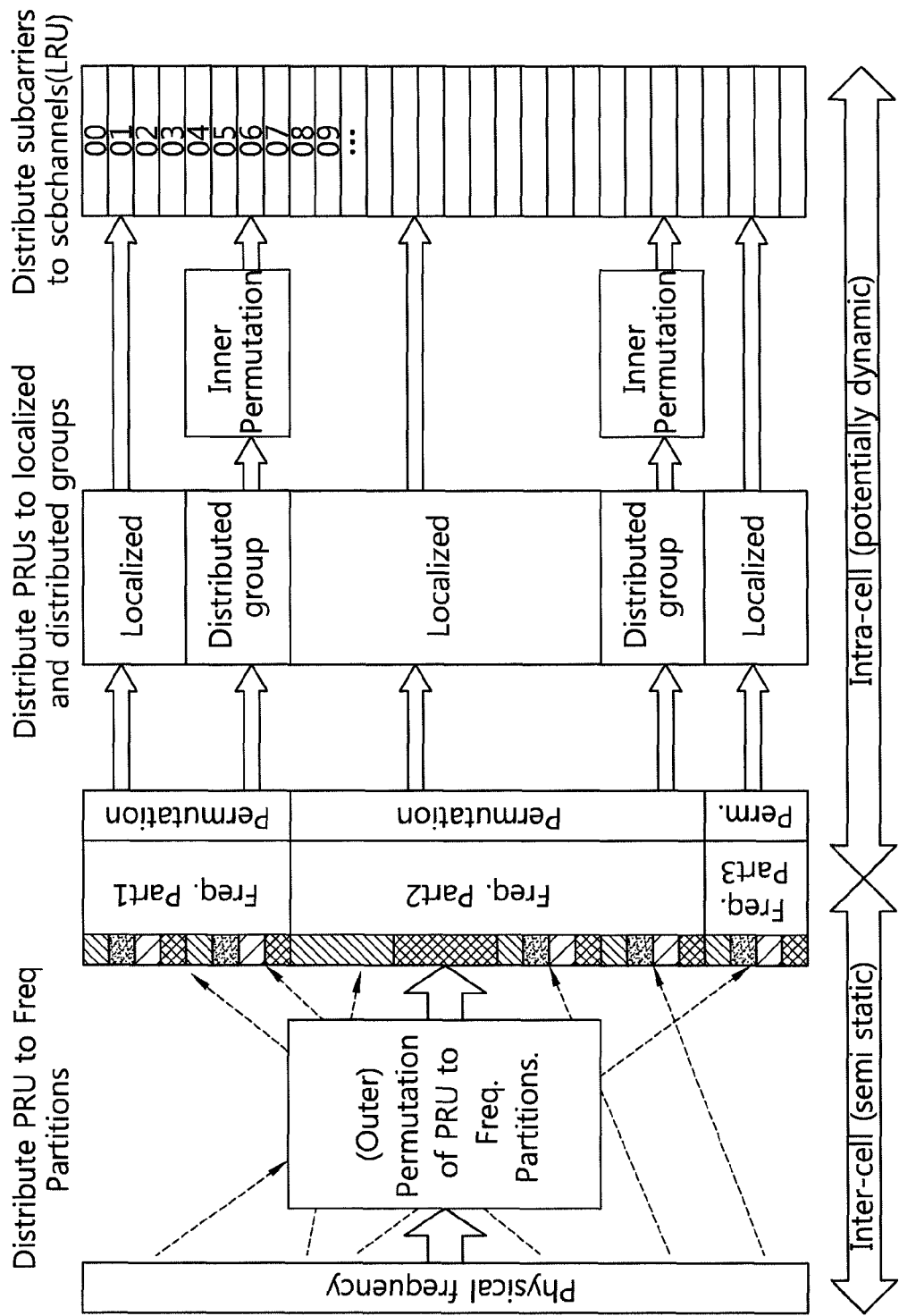
FIG. 6 shows an example of a subchannelization process.

1) Performance of both DLRU and CLRU
2) Reduced assignment signaling overhead and channel quality indicator (CQI) feedback overhead
3) Flexibility in the ratio between distributed resource and localized resources
4) Easy to scale according to bandwidth
5) Feasible and simple to design allocation sequences
6) Flexible and relevant to FFR configuration FIG. 6 shows an example of a subchannelization process. Referring to FIG. 6, subchannelization is performed according to the following procedure.

1) Outer permutation is performed on a PRU. The outer permutation implies mapping of the PRU to each PF. The outer permutation is applied in a granularity of at least one PRU. The outer permutation can be performed in a granularity of $N_1$ or $N_2$ PRUs (where $N_1 > N_2$). In this case, $N_1$ or $N_2$ can vary depending on a bandwidth. However, the outer permutation is effectively achieved when $N_1$ is an integer multiple of $N_2$. The output permutation may imply a process including steps of: dividing a PRU into a subband (SB) PRU (hereinafter, $PRU_{SB}$) and a miniband (MB) PRU (hereinafter, $PRU_{MB}$) similarly to SB partitioning; and performing permutation on the $PRU_{MB}$ in a PRU granularity similarly to MB permutation. The $PRU_{MB}$ is a PRU to be allocated to an SB, and the $PRU_{MB}$ is a PRU to be allocated to an MB. Since the SB uses contiguous PRUs in a frequency domain, the SB is suitable for frequency selective allocation, and the MB is suitable for frequency diversity allocation.

$K_{SB}$ may be defined as the number of SBs having a granularity of $N_1$ in an entire radio resource. When considering the FFR, information on the $K_{SB}$ needs to have the same value between cells. In this case, the information on the $K_{SB}$ may be shared between the cells by using signaling, or may be predetermined according to a bandwidth. In addition, the outer permutation can be performed in such a manner that radio resources are allocated equally for each cell when considering the FFR whereas the radio resources are allocated differently for each cell when not considering the FFR. The information on the $K_{SB}$ may be broadcast from a BS to a UE. When being broadcast, the information can be transmitted using a broadcast channel (BCH) or a super frame header (SFH).

2) A rearranged PRU is distributed to one or more FPs. This step may be included in the "1) outer permutation" and thus be omitted, or may be performed using FP information which is broadcast. One FP may include a granularity of $N_1$ and a granularity of $N_2$, and a reuse region may have the same meaning as the FP. Alternatively, one FP may include only one granularity, and each reuse region may include a plurality of FPs having different granularities of $N_1$ and $N_2$.

3) An FP is divided into a CRU and a DRU for each resource. The division can be achieved in a granularity of $N_1$ or $N_2$. That is, if each FP includes one granularity, the division can be achieved for each FP, and if each FP includes different granularities, the division can be achieved in each granularity. In addition, sector-specific permutation can be supported, and direct resource mapping can be supported for contiguous resources. A size of distributed/contiguous resources can be set flexibly for each sector.

4) A contiguous group and a distributed group are mapped to an LRU.

Inner permutation (or subcarrier permutation) defined for distributed resource allocation in one FP enables spreading of subcarriers for a distributed resource unit in all distributed resources. The inner permutation can be performed based on a subcarrier or a tile. A granularity of the inner permutation is identical to a basic unit of constituting a distributed resource unit. Subchannelization for distributed resources enables spreading of subcarriers for the LRU of the all distributed resources.

There is no inner permutation for contiguous resource allocation. A PRU is directly mapped to a contiguous resource unit in each FP.

Hereinafter, a proposed method of mapping a resource unit will be described according to an embodiment of the present invention.

A radio resource is divided into a $PRU_{SB}$ and a $PRU_{MB}$. The $PRU_{SB}$ consists of $K_{SB}$ SBs, and the $PRU_{MB}$ consists of $K_{MB}$ MBs. A permutated $PRU_{MB}$ ($PPRU_{MB}$) can be configured by performing permutation on the $PRU_{MB}$ one more time. The SBs constituting the $PRU_{SB}$ and the MBs constituting the $PRU_{MB}$ can be allocated to one or more FPs. Basically, one FP is allocated, and a maximum number of FPs (i.e., FP count) may be 4. Hereinafter, FPi denotes an $i^{th}$ FP. The remaining FPs other than an FP0 may include the same number of PRUs.

Figure 7:
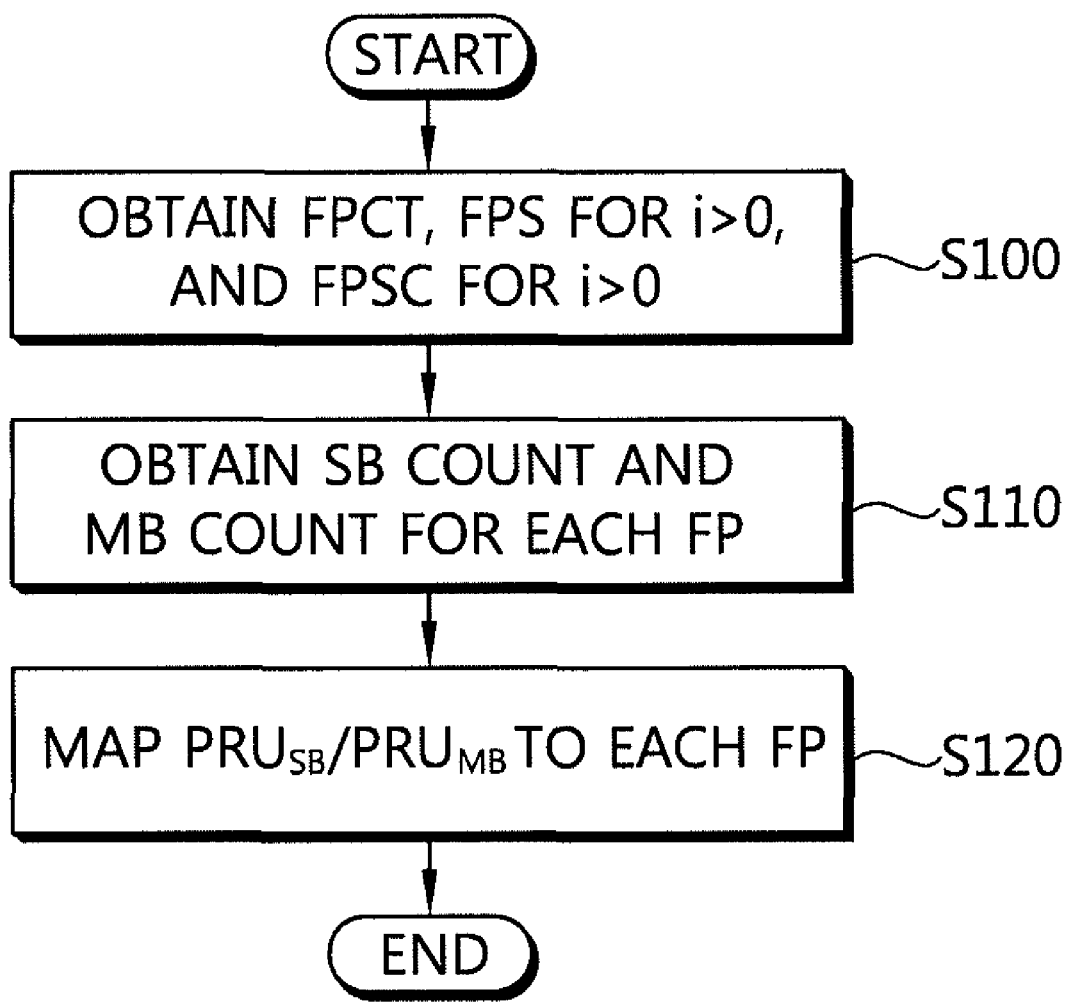
FIG. 7 is a flowchart showing a proposed method of mapping a resource unit according to an embodiment of the present invention.

FIG. 7 is a flowchart showing a proposed method of mapping a resource unit according to an embodiment of the present invention.

In step S100, a UE obtains an FP count (FPCT), an FPi size (FPS) for i>0, and an FPi subband (SB) count (FPSC) for i>0.

The FPCT, the FPS, and the FPSC can be obtained by receiving information regarding frequency partition configuration (FPC). The FPC may be broadcast, and may have a size of 12 bits. First 2 bits may carry a frequency partition count (FPCT) field that is information indicating the number of FPs. The subsequent 6 bits may carry a frequency partition size (FPS) field that is information indicating the number of PRUs allocated to the FPi for i>0. Therefore, the number of PRUs included in an FP0 can be obtained by subtracting a total number of PRUs included in the FPi for i>0 from the number of all PRUs. The remaining 4 bits may carry a subband count (SC) field that is information indicating the number of SBs allocated to the FPi for i>0. Therefore, the number of SBs included in the FP0 can be obtained by subtracting a total number of SBs included in the FPi for i>0 from the $K_{SB}$. In general, a primary FP for transmitting a control signal can be considered as the FP0. In this case, signaling may be performed by specifying the number of SBs included in the FP0.

Alternatively, the FPCT and the FPS can be obtained by mapping them to predetermined configuration information of the FPC. That is, the FPCT and the FPS can be obtained by predetermining a specific case frequently used among various cases of the FPCT and the FPS as configuration information and by receiving the configuration information. The configuration information may have a size of 3 or 4 bits according to a bandwidth. The configuration information may be broadcast.

Table 1 shows an exemplary relationship among a downlink frequency partition configuration (DFPC), an FPCT and an FPS at 5 MHz. The DFPC implies an FPC in downlink.

TABLE 1

| DFPC | FP0:FP1:FP2:FP3 | FPCT | FPS0 | FPSi(i > 0) |
|---|---|---|---|---|
| 0 | 1:0:0:0 | 1 | $N_{PRU}$ | 0 |
| 1 | 0:1:1:1 | 3 | 0 | $N_{PRU}*1/3$ |
| 2 | 1:1:1:1 | 4 | $N_{PRU}*1/4$ | $N_{PRU}*1/4$ |
| 3 | 3:1:1:1 | 4 | $N_{PRU}*3/6$ | $N_{PRU}*1/6$ |
| 4 | 9:5:5:5 | 4 | $N_{PRU}*9/24$ | $N_{PRU}*5/24$ |
| 5~7 | reserved | | | |

Referring to Table 1, an FPCT, a ratio of respective FPSs, the number of PRUs included in each FP, etc., are mapped to each DFPC. An FPi for i>0 includes the same number of PRUs. For example, if the DFPC is 2, each FP has the same size, and thus includes the same number of PRUs.

Table 2 shows an exemplary relationship among a DFPC, an FPCT, and each FPS at 10 MHz.

TABLE 2

| DFPC | FP0:FP1:FP2:FP3 | FPCT | FPS0 | FPSi(i > 0) |
|---|---|---|---|---|
| 0 | 1:0:0:0 | 1 | $N_{PRU}$ | 0 |
| 1 | 0:1:1:1 | 3 | 0 | $N_{PRU}*1/3$ |
| 2 | 1:1:1:1 | 4 | $N_{PRU}*1/4$ | $N_{PRU}*1/4$ |
| 3 | 3:1:1:1 | 4 | $N_{PRU}*3/6$ | $N_{PRU}*1/6$ |
| 4 | 5:1:1:1 | 4 | $N_{PRU}*5/8$ | $N_{PRU}*1/8$ |
| 5 | 9:5:5:5 | 4 | $N_{PRU}*9/24$ | $N_{PRU}*5/24$ |
| 6~7 | reserved | | | |

Table 3 shows an exemplary relationship among a DFPC, an FPCT, and each FPS at 20 MHz.

TABLE 3

| DFPC | FP0:FP1:FP2:FP3 | FPCT | FPS0 | FPSi(i > 0) |
|---|---|---|---|---|
| 0 | 1:0:0:0 | 1 | $N_{PRU}$ | 0 |
| 1 | 0:1:1:1 | 3 | 0 | $N_{PRU}*1/3$ |
| 2 | 1:1:1:1 | 4 | $N_{PRU}*1/4$ | $N_{PRU}*1/4$ |
| 3 | 3:1:1:1 | 4 | $N_{PRU}*3/6$ | $N_{PRU}*1/6$ |
| 4 | 5:1:1:1 | 4 | $N_{PRU}*5/8$ | $N_{PRU}*1/8$ |
| 5 | 9:1:1:1 | 4 | $N_{PRU}*9/12$ | $N_{PRU}*1/12$ |
| 6 | 9:5:5:5 | 4 | $N_{PRU}*9/24$ | $N_{PRU}*5/24$ |
| 7~15 | reserved | | | |

When the FPCT and the FPS are obtained using the configuration information, it is necessary to additionally obtain the number of SBs included in the FPi for i>0. A UE can receive an FPSC or a downlink frequency partition subband count (DFPSC). The DFPSC implies an FPSC in downlink. The DFPSC may have a size of 1 to 3 bits according to an SB count.

In step S110, the UE obtains the number of SBs and the number of MBs included in each FP on the basis of the FPCT, the FPS, and the FPSC.

If $K_{SB,FPi}$ denotes the number of SBs included in the FPi, $K_{SB,FPi}$ can be determined by Equation 1 below.

$$K_{SB,FPi} = \begin{cases} K_{SB} - (FPCT-1) \cdot FPSC & i = 0 \\ FPSC & i > 0 \end{cases} \quad \text{[Math Figure 1]}$$

In Equation 1, regarding the FPi for i>0, the number of allocated SBs is equal to the number of obtained FPSCs, and regarding the FP0, the number of allocated SBs is equal to a value obtained by subtracting the product between the FPSC and the FPCT for i>0 from $K_{SB}$.

In addition, if $K_{MB,FPi}$ denotes the number of MBs included in the FPi, $K_{MB,FPi}$ can be determined by Equation 2 below.

$$K_{MB,FPi} = \quad \text{[Math Figure 2]}$$
$$\begin{cases} K_{MB} - (FPCT - 1) \cdot \left(FPS - \dfrac{FPSC \cdot N_1}{N_2}\right) & i = 0 \\ FPS - \dfrac{FPSC \cdot N_1}{N_2} & i > 0 \end{cases}$$

In Equation 2, $N_1$ denotes the number of PRUs included in one SB, and $N_2$ denotes the number of PRUs included in one MB. Referring to Equation 2 above, regarding the FPi for i>0, MBs are allocated for PRUs remaining after allocating SBs, and regarding the FP0, the number of allocated MBs is equal to a value obtained by subtracting a product between the number of MBs allocated to the FPi for i>0 and the FPCT for i>0 from $K_{MB}$.

Equation 2 above can be simplified as Equation 3 below.

$$K_{MB,FPi} = (FPS_i - K_{SB,FPi} \cdot N_1)/N_2 \quad 0 \leq i \leq FPCT \quad \text{[Math FIG. 3]}$$

In step S120, on the basis of the $K_{SB,FPi}$ and the $K_{MB,FPi}$, a $PRU_{SB}$ including a plurality of contiguous PRUs and a $PRU_{MB}$ including a plurality of contiguous PRUs are mapped to each FP in a granularity of a PRU set. The PRU set may include PRUs whose number is equal to the number of the plurality of contiguous PRUs included in one SB. When the $PRU_{MB}$ is mapped to each FP in a granularity of the PRU set, the $PRU_{MB}$ may be first mapped to a $PPRU_{MB}$ by performing permutation in a PRU granularity, and the $PPRU_{MB}$ may be then mapped to each FP in a granularity of the PRU set.

The mapping can be determined by Equation 4 below. $PRU_{FPi}(j)$ denotes a $j^{th}$ PRU of an $i^{th}$ FP.

$$PRU_{FPi}(j) = \quad \text{[Math Figure 4]}$$
$$\begin{cases} PRU_{SB}(k_1) & \text{for } 0 \leq j < L_{SB,FPi} \\ PPRU_{MB}(k_2) & \text{for } L_{SB,FPi} \leq j < (L_{SB,FPi} + L_{MB,FPi}) \end{cases}$$

$PRU_{SB}(k_1)$ denotes a $k_1^{th}$ PRU of the $PRU_{MB}$, and $PPRU_{MB}(k_2)$ denotes a $k_2^{th}$ PRU of the $PPRU_{MB}$. $L_{SB,FPi}$ denotes the number of PRUs allocated to SBs of the FPi, and can be expressed by $L_{SB,FPi} = K_{SB,FPi} \times N_1$. $L_{MB,FPi}$ denotes the number of PRUs allocated to MBs of the FPi, and can be expressed by $L_{MB,FPi} = K_{MB,FPi} \times N_2$.

Meanwhile, $k_1$ and $k_2$ can be determined by Equation 5 and Equation 6.

$$k_1 = \sum_{m=0}^{i-1} L_{SB,FPm} + j \quad \text{[Math Figure 5]}$$

$$k_2 = \sum_{m=0}^{i-1} L_{MB,FPm} + j - L_{SB,FPi} \quad \text{[Math Figure 6]}$$

Referring to Equation 4 to Equation 6, a $PRU_{SB}$ is first allocated in each FP, and a $PRU_{MB}$ is allocated thereafter. An indexing order for a logical region may be identical to an allocation order.

Figure 8:
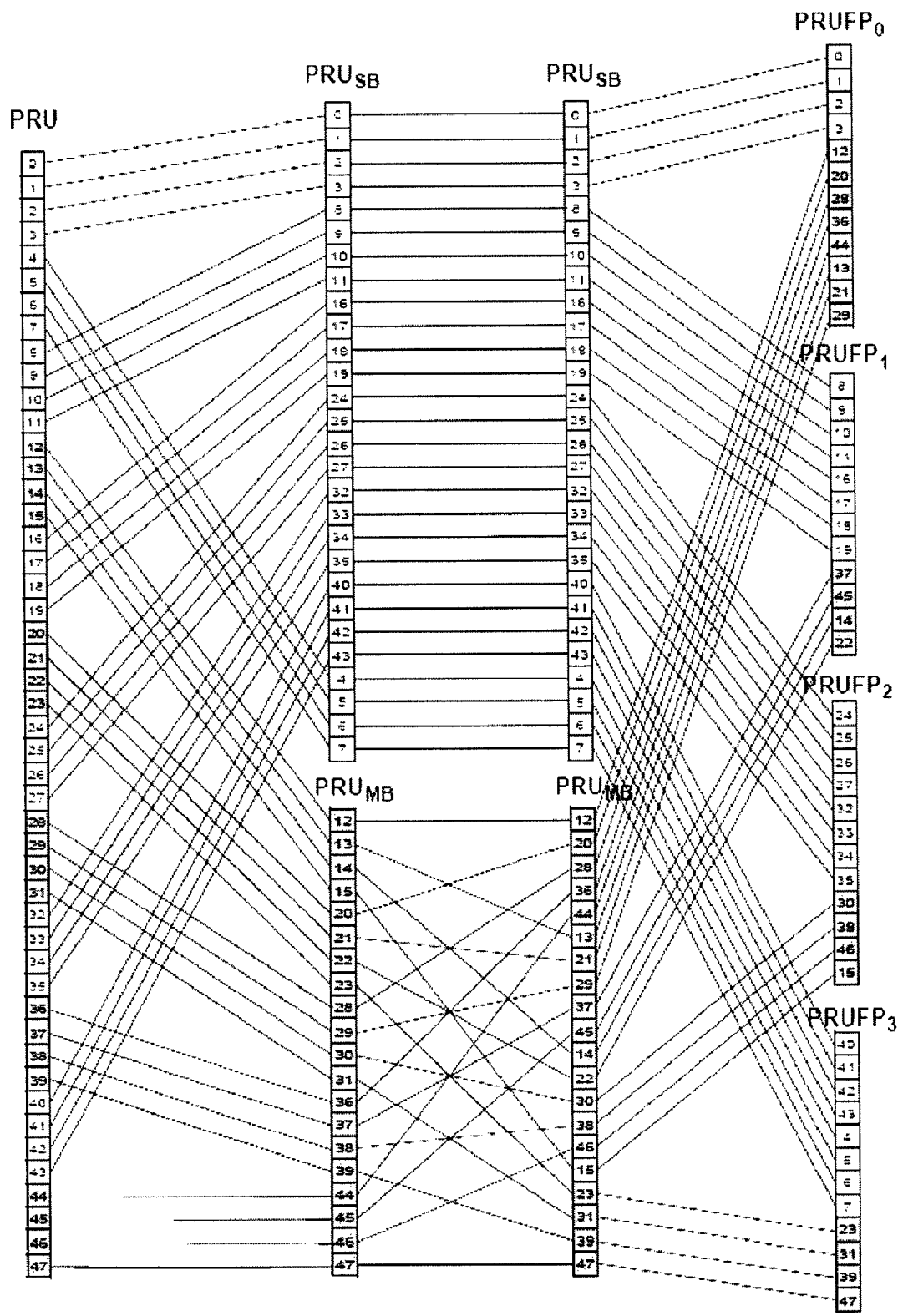
FIG. 8 shows an example of radio resource configuration according to a proposed method of mapping a resource unit.

FIG. 8 shows an example of radio resource configuration according to a proposed method of mapping a resource unit. It is assumed in the present invention that a bandwidth is 10 MHz, and $K_{SB}=7$, FPCT=4, FPS=12, FPSC=2, $N_1=4$, $N_2=1$. An entire radio resource consists of 48 PRUs. Since $K_{SB}=7$, the number of SBs that can be allocated in the entire radio resource is 7. The radio resource is divided into 4 FPs, each of which includes 12 PRUs. Since FPSC=2, an FP1 to an FP3 include two SBs, and thus an FP0 includes one SB. In addition, the FP1 to the FP3 include 4 MBs, and the FP0 includes 8 MBs.

Hereinafter, a method of transmitting data by using the aforementioned method of mapping a resource unit will be described.

Figure 9:
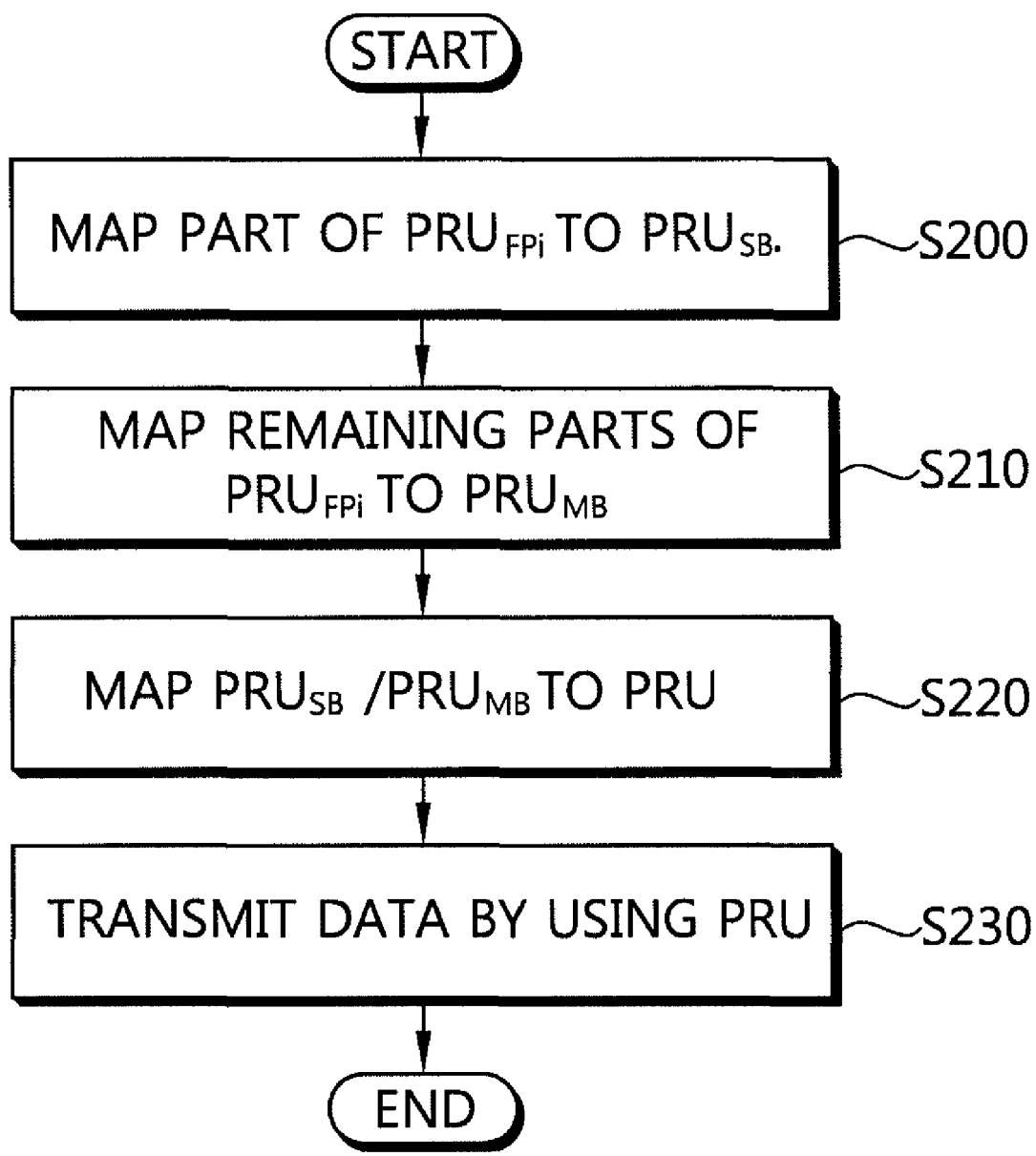
FIG. 9 shows a proposed method of transmitting data according to an embodiment of the present invention.

FIG. 9 shows a proposed method of transmitting data according to an embodiment of the present invention.

In step S200, a UE maps a part of a $PRU_{FPi}$ which is a logical resource included in an FPi, to a $PRU_{SB}$.

In step S210, after mapping to the $PRU_{SB}$, the UE maps the remaining parts of the $PRU_{FPi}$ to a $PRU_{MB}$. When the $PRU_{FPi}$ is mapped to the $PRU_{MB}$, the $PRU_{FPi}$ may be first mapped to a $PPRU_{MB}$, and then the $PPRU_{MB}$ may be mapped to the $PRU_{MB}$ by performing permutation.

Meanwhile, when the $PRU_{FPi}$ is mapped to the $PRU_{SB}$ or the $PRU_{MB}$, mapping can be achieved by Equations 4 to 6 above by using parameters obtained by Equations 1 to 3. The $PRU_{SB}$ is allocated with at least one SB including a plurality of contiguous PRUs. The $PRU_{MB}$ is allocated with at least one MB including a plurality of contiguous PRUs. In addition, a PRU set may include PRUs whose number is equal to the number of the plurality of contiguous PRUs included in one SB.

In step S220, the UE maps the $PRU_{MB}$ or the $PRU_{MB}$ in a granularity of the PRU set to a PRU which is a physical radio resource.

In step S230, the UE transmits data by using the PRU.

Figure 10:
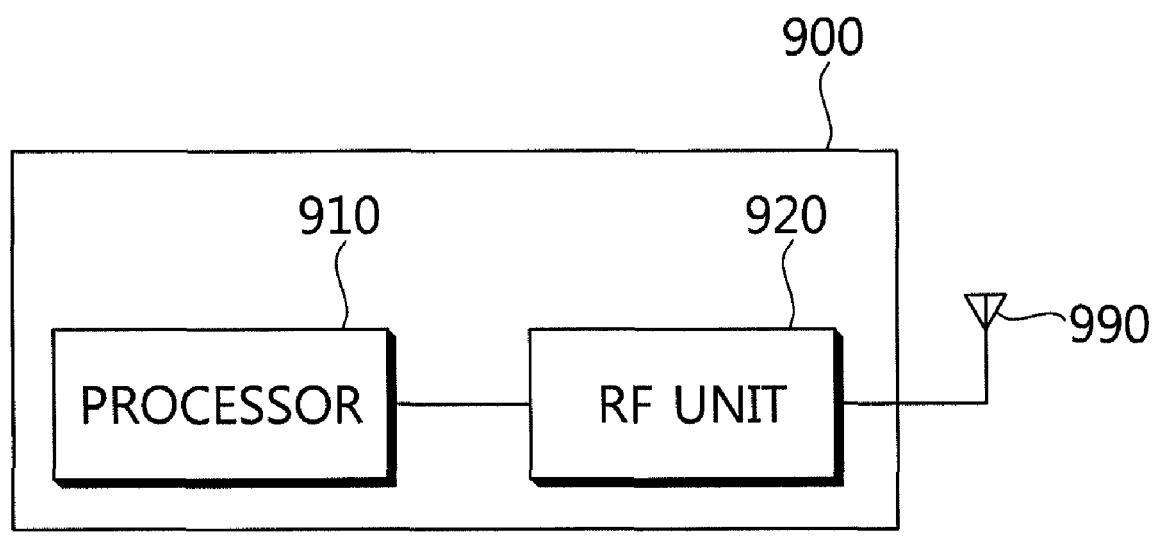
FIG. 10 is a block diagram showing a user equipment according to an embodiment of the present invention.

FIG. 10 is a block diagram showing a UE according to an embodiment of the present invention.

A UE 900 includes a processor 910 and a radio frequency (RF) unit 920. The processor 910 implements a proposed function, process, and/or method. The processor 910 may obtain a frequency partition (FP) count (FPCT), an FPi size (FPS) for i>0, and an FPi subband (SB) count (FPSC) for i>0, may obtain a value $K_{SB,FPi}$ indicating an SB count for each FP and a value $K_{MB,FPi}$ indicating a miniband (MB) count for each FP on the basis of the FPCT, the FPS, and the FPSC, and may map an SB PRU (i.e., $PRU_{SB}$) including a plurality of contiguous PRUs and an MB PRU (i.e., $PRU_{MB}$) including a plurality of contiguous PRUs to each FP in a granularity of a PRU set on the basis of the values $K_{SB,FPi}$ and $K_{MB,FPi}$. In this case, the PRU set may include PRUs whose number is equal to the number of the plurality of contiguous PRUs included in one SB. The RF unit 920 is coupled to the processor 910, and transmits and/or receives radio signals.

The processor 910 may include an application-specific integrated circuit (ASIC), another chip set, a logical circuit, and/or a data processing unit. The RF unit 920 may include a baseband circuit for processing radio signals. In software implemented, the aforementioned methods can be implemented with a module (i.e., process, function, etc.) for performing the aforementioned functions. The module may be performed by the processor 910.

Radio resources to be allocated to one or more frequency partitions (FPs) are respectively selected from a radio resource to be allocated to a subband (SB) and a radio resource to be allocated to a miniband (MB). Therefore, each FP can obtain a frequency selective scheduling gain based on the SB and a frequency diversity gain based on the MB.

Although a series of steps or blocks of a flowchart are described in a particular order when performing methods in the aforementioned exemplary system, the steps of the present invention are not limited thereto. Thus, some of these steps may be performed in a different order or may be concurrently performed. Those skilled in the art will understand that these steps of the flowchart are not exclusive, and that another step can be included therein or one or more steps can be omitted without having an effect on the scope of the present invention.

The aforementioned embodiments include various exemplary aspects. Although all possible combinations for representing the various aspects cannot be described, it will be understood by those skilled in the art that other combinations are also possible. Therefore, all replacements, modifications, and changes should fall within the spirit and scope of the claims of the present invention.

What is claimed is:

1. A method of mapping a resource unit in a wireless communication system, the method comprising:
   obtaining a frequency partition (FP) count (FPCT), a size of FPi (FPS) for i>0, and a subband (SB) count of FPi (FPSC) for i>0 (where FPi is an $i^{th}$ FP);
   obtaining a value $K_{SB,FPi}$ indicating an SB count for FPi and a value $K_{MB,FPi}$ indicating a miniband (MB) count for FPi on the basis of the FPCT, the FPS, and the FPSC; and
   mapping an SB PRU ($PRU_{SB}$) including a plurality of contiguous physical resource units (PRUs) and an MB PRU ($PRU_{MB}$) including a plurality of contiguous PRUs to each FP on the basis of the values $K_{SB,FPi}$ and $K_{MB,FPi}$.

2. The method of claim 1, wherein the values $K_{SB,FPi}$ and $K_{MB,FPi}$ are obtained by the following equation (where FPSi is the number of PRUs included in the FPi):

$$K_{SB,FPi} = \begin{cases} K_{SB} - (FPCT-1) \cdot FPSC & i=0 \\ FPSC & i>0 \end{cases}$$

$$K_{MB,FPi} = (FPS_i - K_{SB,FPi} \cdot N_1)/N_2 \quad 0 \le i \le FPCT.$$

3. The method of claim 1, wherein the mapping of the $PRU_{MB}$ to each FP comprises:
   mapping the $PRU_{MB}$ to a permutated $PRU_{MB}$ ($PPRU_{MB}$) by performing permutation in a PRU granularity; and
   mapping the $PPRU_{MB}$ to each FP.

4. The method of claim 3, wherein the mapping to each FP is performed by the following equation (where $PRU_{FPi}(j)$ denotes a $j^{th}$ PRU of an $i^{th}$ FP, $PRU_{SB}(k_1)$ denotes a $k_1^{th}$ PRU of the $PRU_{SB}$, $PPRU_{MB}(k_2)$ denotes a $k_2^{th}$ PRU of the $PPRU_{MB}$, $L_{SB,FPi}$ denotes the number of PRUs allocated to SBs of the FPi, and $L_{MB,FPi}$ denotes the number of PRUs allocated to MBs of the FPi):

$$PRU_{FPi}(j) = \begin{cases} PRU_{SB}(k_1) & \text{for } 0 \le j < L_{SB,FPi} \\ PPRU_{MB}(k_2) & \text{for } L_{SB,FPi} \le j < (L_{SB,FPi}+L_{MB,FPi}), \end{cases}$$

where $k_1$ and $k_2$ can be determined by the equation:

$$k_1 = \sum_{m=0}^{i-1} L_{SB,FPm} + j$$

$$k_2 = \sum_{m=0}^{i-1} L_{MB,FPm} + j - L_{SB,FPi}.$$

5. The method of claim 1, wherein the FPCT, the FPS, and the FPSC are broadcast.

6. The method of claim 1, wherein the FPCT, the FPS, and the FPSC vary depending on a bandwidth.

7. A method of transmitting data in a wireless communication system, the method comprising:
   mapping a part of a part of a $PRU_{FPi}$, which is logical resource included in an $i^{th}$ FP (i.e., FPi), to a $PRU_{SB}$;
   mapping the remaining parts of the $PRU_{FPi}$ to a $PRU_{MB}$ after mapping to the $PRU_{SB}$;
   mapping the $PRU_{SB}$ or the $PRU_{MB}$ in a granularity of a PRU set to PRUs which is a physical radio resource; and
   transmitting data by using the PRU,
   wherein the $PRU_{SB}$ is allocated with at least one SB including a plurality of contiguous PRUs, the $PRU_{MB}$ is allocated with at least one MB including a plurality of contiguous PRUs, and the PRU set includes PRUs whose number is equal to the number of the plurality of contiguous PRUs included in one SR,
   wherein the mapping of the remaining parts of the $PRU_{FPi}$ to the $PRU_{MB}$ comprises mapping the remaining parts of the $PRU_{FPi}$ to a $PPRU_{MB}$ and mapping the $PPRU_{MB}$ to the $PRU_{MB}$ by performing permutation, and
   wherein the mapping of the $PRU_{FPi}$ included in the FPi to the $PRU_{SB}$ or the $PRU_{MB}$ is performed by the following equation (where $PRU_{FPi}(j)$ denotes a $j^{th}$ PRU of an $i^{th}$ FP, $PRU_{SB}(k_1)$ denotes a $k_1^{th}$ PRU of the $PRU_{SB}$, $PPRU_{MB}(k_2)$ denotes a $k_2^{th}$ PRU of the $PPRU_{MB}$, $L_{SB,FPi}$ denotes the number of PRUs allocated to SBs of the FPi, and $L_{MB,FPi}$ denotes the number of PRUs allocated to MBs of the FPi):

$$PRU_{FPi}(j) = \begin{cases} PRU_{SB}(k_1) & \text{for } 0 \le j < L_{SB,FPi} \\ PPRU_{MB}(k_2) & \text{for } L_{SB,FPi} \le j < (L_{SB,FPi}+L_{MB,FPi}) \end{cases}$$

where $k_1$ and $k_2$ can be determined by the equation:

$$k_1 = \sum_{m=0}^{i-1} L_{SB,FPm} + j$$

$$k_2 = \sum_{m=0}^{i-1} L_{MB,FPm} + j - L_{SB,FPi}.$$

8. An apparatus in a wireless communication system, the apparatus comprising:
a radio frequency (RF) unit for transmitting and receiving a radio signal; and
a processor operatively coupled to the RF unit and configured to:
obtain a frequency partition (FP) count (FPCT), an size of FPi (FPS) for i>0, and an subband (SB) count of FPi (FPSC) for i>0 (where FPi is an $i^{th}$ FP);
obtain a value $K_{SB,FPi}$ indicating an SB count for FPi and a value $K_{MB,FPi}$ indicating a miniband (MB) count for FPi on the basis of the FPCT, the FPS, and the FPSC; and
map an SB PRU ($PRU_{SB}$) including a plurality of contiguous physical resource units (PRUs) and an MB PRU ($PRU_{MB}$) including a plurality of contiguous PRUs to each FP on the basis of the values $K_{SB,FPi}$ and $K_{MB,FPi}$.

* * * * *